MAGNETIC GATE AND HEAD SWITCHING NETWORK EMPLOYING THE SAME

Filed Jan. 18, 1957 2 Sheets-Sheet 1

INVENTOR.
THEODORE H. BONN

Charles E. English
AGENT

June 6, 1961 T. H. BONN 2,987,709

MAGNETIC GATE AND HEAD SWITCHING NETWORK EMPLOYING THE SAME

Filed Jan. 18, 1957 2 Sheets-Sheet 2

INVENTOR.
THEODORE H. BONN

Charles G. English
AGENT

United States Patent Office 2,987,709

Patented June 6, 1961

2,987,709

MAGNETIC GATE AND HEAD SWITCHING NETWORK EMPLOYING THE SAME

Theodore H. Bonn, Merion Station, Pa., assignor to Sperry Rand Corporation, New York, N.Y., a corporation of Delaware Filed Jan. 18, 1957, Ser. No. 634,976

10 Claims. (Cl. 340—174.1)

This invention relates to magnetic switching devices and magnetic switching systems incorporating such devices.

Electrical switches and switching systems are old, but the majority of the prior art switching devices are mechanical in nature and suffer from the same disadvantages that all mechanical devices having moving parts suffer from; namely inertia, unreliability, wear, etc. In addition to the delays in operation occasioned by the inertia of mechanical structures and friction encountered between moving parts, those switching devices which included electrical contacts also suffered from the additional disadvantage of arcing when the contacts opened.

These disadvantages were overcome to a great extent by the advent of electron discharge devices such as the gas or vapor tubes and the vacuum tubes. But with the elimination of some of the older disadvantages by the substitution of newer devices, new disadvantages became evident. The vacuum tubes required filaments which greatly decreased their efficiency and added to the heat load of the equipment in which they were used. The gas and vapor type tubes did not always require filament power and also gave off less heat, but they were harder to control, for once conduction was initiated in the tube by a control electrode, that electrode lost control of the conduction.

It is therefore an object of this invention to provide new and improved switching devices which overcome the disadvantages of the prior art.

It is another object of this invention to provide new and improved switching devices, and new and improved systems incorporating such new devices.

In carrying out the present invention, a plurality of recording heads and a plurality of sources of information signals are provided together with means for selectively connecting certain of said recording heads to particular sources of information signals. The means for making this connection utilizes a first switch means for each of the sources which is comprised of a magnetic core having a rectangular hysteresis loop, the core being linked by an input coil and a control coil. The power coil is connected in circuit with an information signal source, and the control coil is connected to a source of periodic control signals. Energization of the control coil by a control signal creates a magnetomotive force which opposes the magnetomotive force developed by the input coil when energized by an information signal. This opposition of magnetomotive forces causes the input coil to present a small impedance to the transmission of information signals during the occurrence of a control signal. In addition, another switch is provided for each head or group of heads to complete the connection between the sources of information and the selected heads during the period of the control signal. Information signals are transmitted to the selected heads over a range of values of current through the input coils limited by the magnitude of the periodic signals through the control coils.

Other advantages and objects of this invention will become apparent from a study of the following description which should be considered with the accompanying drawings in which.

Figure 1:
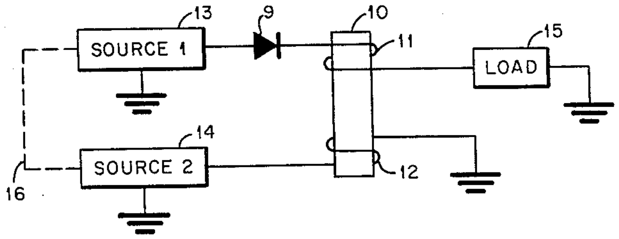
FIG. 1 is a diagram, partially schematic, of a magnetic switching device.

Referring to the drawings in detail and more particularly to FIG. 1, the reference character 10 designates a core of magnetic material which may have a square hysteresis loop and about which are wound coils 11 and 12. The coil 11 is connected at one end to a cathode of a diode 9, the anode of which is connected to the output of a source 13 of electrical energy. The other end of the coil 11 is connected to the input of a load device 15, the other end of which is grounded. One end of the coil 12 is connected to the output of a source 14 of electrical energy and the other end of the coil 12 is grounded. Sources 13 and 14 are preferably, but not necessarily, unidirectional pulsating sources which produce positive pulses either in alternation or in synchronism, for example.

The operation of the device of FIG. 1 will be discussed in connection with the curve of FIG. 2 which depicts a typical hysteresis loop for the core 10. When a positive pulse from source 14 is applied to the coil 12, the core material is placed in the remanent condition represented by, say, the point 17 on the curve of FIG. 2. Since the coils 11 and 12 are wound on the core 10 in opposite directions, the subsequent application of a positive pulse from the source 13 to the winding 11 causes the core material to change its magnetic condition toward the condition represented by the point 18 on the curve of FIG. 2. Whenever the condition of the magnetic flux in the core 10 is changed appreciably, energy causing the change is absorbed by the core itself. Thus, if the pulse from the source 13 is used to change the condition of the core from point 17 to point 18, substantially none of the applied pulse reaches the load 15, and the coil 11 gives the appearance of a high impedance. If, however, positive pulses are applied simultaneously to the coils 11 and 12, the flux changes in the core produced by the two coils cancel each other, and the net effect is no change in the flux condition of the core 10. Therefore, when pulses are applied to the coils 11 and 12 simultaneously, the coil 11 appears as a low impedance, and substantially all of the energy applied to the coil 11 is transmitted to the load 15. From this it can be seen that the device of FIG. 1 will transmit a signal pulse from the source 13 to the load 15 only if the two windings 11 and 12 are simultaneously energized.

Figure 2:
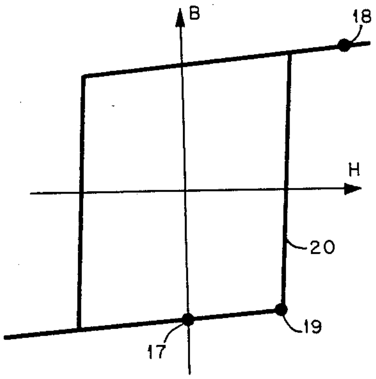
FIG. 2 is an idealized curve illustrative of the hysteresis action of magnetic materials.

Assuming that the state of the core is initially at point 17, then if the pulse from the source 13 is larger than the pulse from the source 14, and if the windings 11 and 12 are substantially identical, there will be a resultant flux change in the core 10 upon the simultaneous enerization of the two coils tending to change the condition of the core 10 from that represented by the point 17 toward that represented by the point 18 of the curve of FIG. 2. As the core is changed from one condition to another, the largest change occurs at the condition represented by the point 19 which is at a knee of the curve of FIG. 2, and as the condition of the core 10 changes past the point 19 toward point 18, the impedance of the coil 11 rises sharply. A sharp rise in the impedance of the coil 11 tends to limit the current flow through the coil to a value only slightly greater than the current flow through coil 12.

Figure 3:
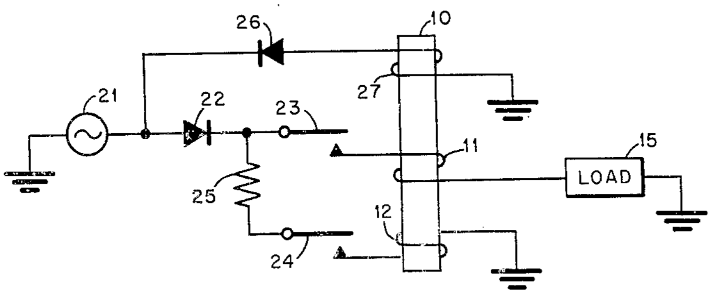
FIG. 3 is a schematic diagram of a magnetic switching and signal limiting device similar to the device of FIG. 1.

Since the device of FIG. 1 operates to pass a signal from the source 13 to the load 15 only when the windings 11 and 12 are simultaneously energized, it is desirable to synchronize the outputs of the sources 13 and 14. FIG. 3 illustrates a circuit which operates similarly to that of FIG. 1, but which provides for the synchronization of the pulses applied to the coils. A source of alternating energy 21 is connected at one end to ground and at its other end to the anode of a diode 22, the cathode of which is connected to one side of a switch 23 and through a resistor 25 to one side of a switch 24. The other side of the switch 23 is connected to one side of a coil 11 which is identical with the coil 11 of FIG. 1, and the other side of the switch 24 is connected to one side of a coil 12, which is identical with the coil 12 of FIG. 1. The other side of the coil 11 is connected to one side of a load 15, the other side of which, together with the other side of coil 12, is connected to ground. Also connected to the anode of the diode 22 is the cathode of a diode 26, the anode of which is connected to one side of a third coil 27 wound around core 10. The other side of the coil 27 is connected to ground. The coils 27 and 11 are wound in the same direction about the core 10, and the winding 12 is wound in a direction opposite to that of the coils 11 and 27.

The diode 22 passes only positive pulses from the source of alternating energy 21 to the switches 23 and 24 and the diode 26 passes only negative pulses from the source 21 to the coil 27. Since the windings 12 and 27 are oppositely wound and also oppositely energized, their effect upon the core 10 is the same. The coil 27 is energized every negative half cycle of the source 21 intermediate the energization of the switches 23 and 24. The coils 11 and 12 are each energized only on a positive half cycle of the source 21 and only if the associated switch 23 or 24 is closed. Switches 23 and 24 may be controlled by external means such as the control circuits of another machine.

The effect of the repetitive energization of coil 27 is to place the core 10 in the condition represented by point 17 each half cycle of the source 21. If the switch 24 is then closed, the resulting energization of the coil 12 will drive the core 10 further into negative saturation and will have substantially no effect upon the circuit. If the switch 23 is closed and the switch 24 is opened, then the energization of the coil 11 will drive the core from the condition represented by the point 17 toward that of the point 18, causing a large change of flux in the core 10 and resulting in substantially no flow of current to the load 15. The next negative pulse applied to the coil 27 returns the core to the condition of point 17. If the switches 23 and 24 are both closed then both coils 11 and 12 will be energized, and the load 15 will receive a large signal. The resistor 25 limits the amount of current flow to the coil 12 below that to the coil 11 with the result that the coil 11 produces a greater effect upon the core 10 than does the coil 12 when both are energized. This causes the flux in the core 10 to shift from the point 17 toward 20, and the limiting action of the device becomes operative as the flux condition of the core changes past the knee 19. In this manner, a generally constant amplitude of output pulse is assured since all of the output signals are limited by the action of the core 10.

The gating and limiting actions of the devices of FIGS. 1 and 3 prove very useful in many switching systems where they greatly enhance the overall action of the entire system. The circuit of FIG. 4 is but one example of such a switching system and provides a means for connecting pulse input sources 101A–D to any one of magnetic read-write transducing heads 115, 116, or 117.

A source of input signals 101A is connected at one end to ground and at the other end to a stationary contact of a single pole double throw switch 102A, the movable contact of which is connected by means of an input terminal 140, through diodes 112, 113, and 114 in parallel to one side of each of windings 107, 108, and 109. The other side of winding 107 is connected by means of output terminal 150 through an input terminal 160 to one side of a read-write head section 115A. The windings 107, 108 and 109 are wound on a core 106 of magnetic material. Also mounted on the core 106 is a fourth winding 111 which is connected to ground at one end and, through an input terminal 141, to the movable contact 124A of a switch at the other end. The core 106 with the windings 107, 108, 109, and 111 which comprise a switching device 105A, corresponds to the devices of FIGS. 1 and 3 hereinbefore described. The windings 107, 108, and 109 have their inputs in parallel and together correspond to the winding 11 of the other figures, and the winding 111 is the same as the windings 12 of the earlier figures.

Figure 4:
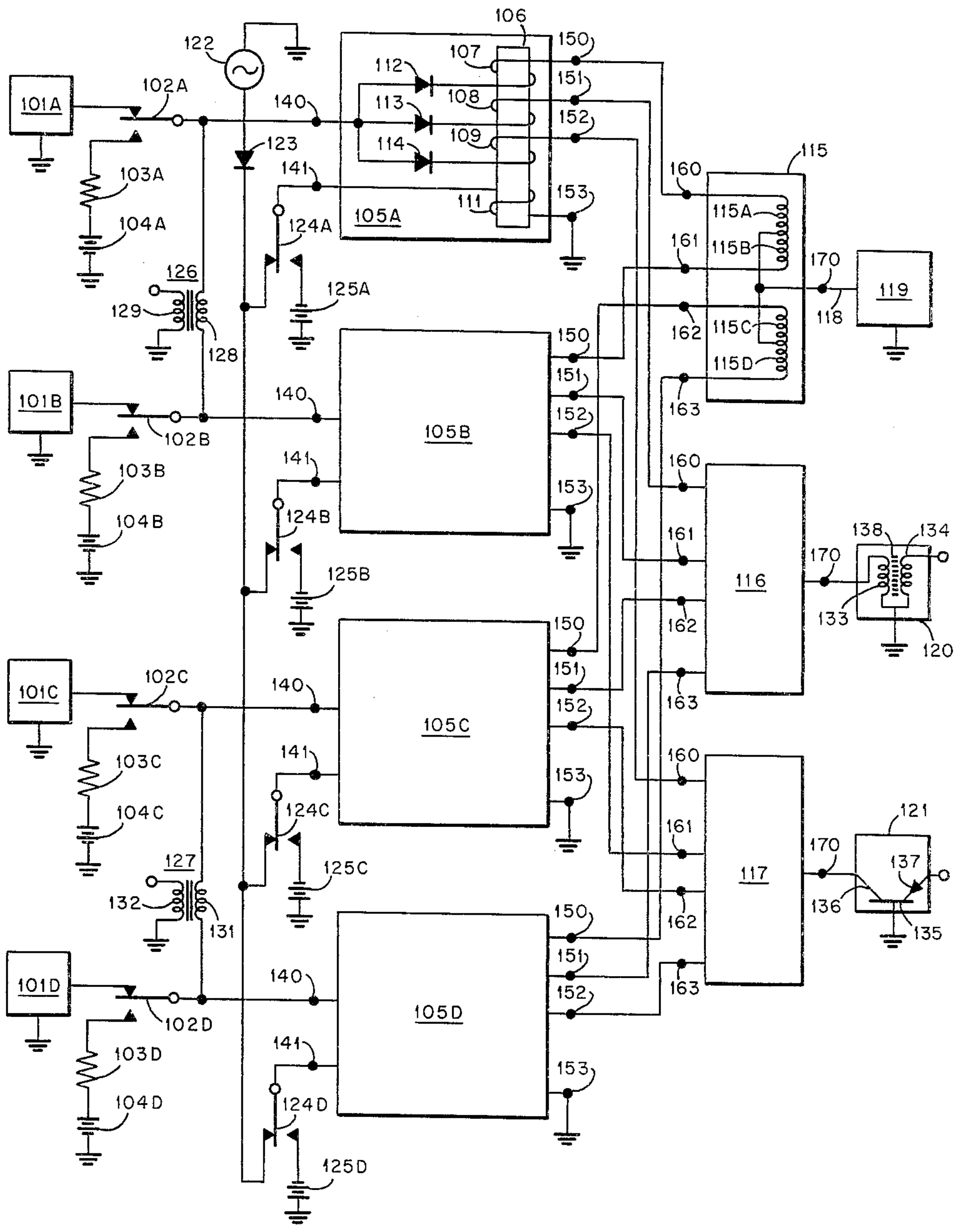
FIG. 4 is a wiring diagram of a magnetic recorder head switching system incorporating the magnetic switching devices of this invention.

One of the limiting and switching circuits 105A, 105B, 105C, and 105D is illustrated in detail and the others are denoted by blocks in FIG. 4 since they are all identical in both structure and operation, and their detailed illustration would only serve to clutter the drawing. The corresponding connections to the different blocks are designated by the input and output terminals; terminals with the same numbers denoting connections to similar type circuitry within the blocks. The same is true of the read-write head structures 115, 116, and 117; only 115 being illustrated in detail to avoid undue confusion.

The other end of the winding 108 is connected through an output terminal 151 to an input terminal 160 of head 116, which terminal is connected to one side of the head section corresponding in head 116 to the section 115A in head 115. As illustrated with respect to head 115, each head 115, 116, and 117 comprises two center-tapped coils which form four head sections, 115A, 115B, 115C, and 115D. The corresponding sections of heads 116 and 117 would be designated by corresponding letters, the letters also designating to which one of the input sources 101A, 101B, 101C or 101D the particular section is connected. Thus, the windings 107, 108, and 109, all of which are mounted on the core 106 and are connected in parallel at their inputs to the source 101A, are connected at their other ends to the section A of each of the heads 115, 116, and 117. The heads 115, 116 and 117 are, for the purposes of this discussion, each representative of a group of two recording-reproducing transducers which record upon and read from different tracks of a moving magnetic medium; the sections 115A and B recording on and reading from one track of said medium which is adjacent a similar track for sections 115C and D. The same is true for heads 116 and 117. The other end of the winding 107 is connected to the terminal 160, which is connected to the head section 115A, the other end of the winding 108 is connected to the input terminal 160 of head 116 which, in turn, is connected, but not shown as such, to the section 116A, and the other end of the winding 109 is connected to the input terminal 160 of the head 117 which is connected to the section 117A. The other ends of each of the sections is connected together and to an output terminal 170. The output terminal 170 of each of the heads is connected to ground through switch means which are shown at 119, 120 and 121 respectively for heads 115, 116 and 117. For purposes of illustration output terminal 170 of the head 116 is connected to a magnetic switch 120 and head 117 is shown utilizing a transistor type switch 121. In the case of switch 120 the head terminal 170 is connected to one side of a winding 133, the other side of which is connected to ground. The winding 133 forms part of the magnetic switch 120, which also comprises a winding 134 and a saturable core 138. The output terminal 170 of the head 117 is connected to the collector electrode 136 of the transistor switch 121 which further comprises a base 135 and an emitter electrode 137.

The inputs to the switching and limiting devices

105A–D from the input sources 101A–D are selectively completed through switches 102A–D. The input terminals 140 are connected to the movable contacts of the switches 102A–D, and the input sources 101A–D are each connected to one of the stationary contacts. The other of the stationary contacts of each of the switches is connected to one end of a resistor 103A–D, the other end of which is connected to the positive terminal of a source of direct potential 104A–D, the negative terminal of which is connected to ground. The input terminals 141 of each of the devices 105A–D is connected to a movable contact of a switch 124A–D, one stationary contact of which is connected through a diode 123 to one side of a source of alternating potential 122 whose other side is grounded, and the other stationary contact of which is connected to the negative terminal of a source of direct potential 125A–D, the other side of which is grounded.

Connected across the input terminals 140 of the devices 105A and 105B is the primary winding 128 of an output transformer 126 which also comprises a secondary winding 129. The primary winding 131 of an output transformer 127 is connected between the input terminals 140 of the devices 105C and 105D, and feeds a secondary winding 132.

In the operation of the system of FIG. 4, the positions of the switches 102A–D and 124A–D determine whether a reading or a writing operation is to take place. FIG. 4 illustrates the set-up for writing. Only one side of each of the input sources 101A–D is connected through the devices 105A–D to the heads 115, 116, and 117. The other side of each of the input sources is grounded, and the selection of the head to be used is made by connecting the terminal 170 of a head to ground by means of a switch 119, 120, or 121, thus completing the circuit through the chosen head. In the system of FIG. 4, it is contemplated that only two bits be recorded simultaneously; bits from either 101A or 101B and from either 101C or 101D may be recorded at any instant, the other bit of the pair being recorded subsequently. It is assumed that the bits from all of the sources 101A–D are of the same polarity, and bits from adjacent sources passing through adjacent head sections will be recorded in opposite polarity because the heads 115, 116 and 117 are center-tapped.

To record a bit from the source 101A through the head 115, the switch 119 is closed by any suitable means, connecting the terminal 170 of the head 115 to ground. The diodes 112, 113 and 114 are so poled that only positive pulses from the source 101A are applied to the windings 107, 108 and 109. However, as explained in connection with the devices of FIGS. 1 and 3, each of the coils 107, 108 and 109 represents a high impedance unless the coil 111 is also energized with a pulse of the same polarity. Since the head 115 has been selected for writing and only the winding 107 of the device 105A is connected thereto, only this winding will be discussed. Upon the simultaneous application of a positive pulse from the source 101A through the switch 102A to the winding 107 and also from the source of alternating potential 122 through the diode 123 and the switch 124A to the winding 111, an output signal will be transmitted to the input terminal 160 of the head 115, and energy will pass through the head section 115A, output terminal 170, and switch 119 to ground.

The output signal from coil 107 is transmitted to the terminal 160 of the head 115 and passes downward through the head section 115A and out through the terminal 170, as the head is illustrated in FIG. 4. If a signal from the source 101B is to be recorded on the head 115, the appropriate signal output from the device 105B passes through the terminal 150 into the terminal 161 of the head 115, and current flows upwardly through the head section 115B to the output terminal 170. Therefore, if the output signal from source 101A and that from source 101B are of the same polarity, they will be recorded on the magnetic recording medium as opposite polarity signals because they pass through the head 115 in opposite directions. To avoid cancellation in the head 115, the signals from the sources 101A and 101B can not both be applied to any of the heads at the same time, but must be applied sequentially.

For reading information from the record medium, one of the switches 119, 120, or 121 must be closed to select the desired head the same as was done for writing. Assuming again that the switch 119 is closed grounding the terminal 170 of the head 115, the switches 102A–D and 124A–D must be changed into their other condition. In this condition, the input terminals 140 of the devices 105A–D are connected through the resistors 103A–D to the positive terminals of the sources of direct potential 104A–D. Also, the input terminals 141 of the devices 105A–D are connected to the negative terminals of the sources of direct potential 125A–D. In this manner a steady current through the coil 111 of the device 105A and also through its counter parts in the devices 105B–D is maintained to insure that the core members 106 are kept in a low impedance state. A current flow is also maintained through coil 107, and its counter part in device 105B to render the diode 112, and its counter part in 105B conductive and keep their impedances low. The fluxes generated by the currents flowing through the coils 107 and 111 add to maintain the core in the condition 18 so that any signal picked-up by the heads will find the core in a low impedance state. The current flows through the coils 107 and 111 pass through circuits having ground a portion. Therefore, such current flows will be maintained only through those heads whose terminals 170 are grounded and through the coils connected to such grounded heads. If the record medium is moved passed the heads 115, 116, and 117, magnetic variations recorded on the medium induce voltages in these heads, and current flows through those coils which are at low impedance. The recorded magnetic variations passing the head 115 induce potentials across the two head sections 115A and 115B and also across the two head sections 115C and 115D in series, causing potentials to appear across the terminals 160—161 and 162—163. Output transformers 126 and 127 are therefore connected across the appropriate terminals 140 of the devices 105A–D which correspond to the selected head sections. Electrical signals corresponding to recorded magnetic variations of the record medium are induced in the secondary windings 129 and 132.

The switch 119 has been depicted as a block since the type of switch used in the system of FIG. 4 is immaterial to the invention. However, in the box 120 a magnetic switch has been shown. Normally the coil 133 represents a high impedance, but the application of a control pulse to the terminal of the coil 134 will saturate the core 138, lowering the impedance of the coil 133, and effectively grounding the terminal 170. Thus, to connect the terminal 170 to ground, a control pulse is supplied to the winding 134.

In the block 121 a transistor switch is shown. Normally the impedance between the base 135 and the collector electrode 136 is high, but the application of a control signal to the emitter electrode 137 causes current to flow through the transistor, lowering the impedance between the base 135 and the collector 136, and effectively grounding the terminal 170 of the head 117.

A new and improved magnetic switching device and a switching system utilizing said element have been described above. Other modifications and uses of the above described invention will become obvious to those skilled in the art without the exercise of invention, and it is intended that this invention be limited only by the scope and extent of the appended claims.

What is claimed is:

1. In a system of recording, a first group of two center-tapped coils, a second group of two center-tapped coils, first switch means connected at one end to the center taps of the coils of the first group for selectively grounding and ungrounding these center taps, second switch means connected at one end to the center taps of the coils of the second group for selectively grounding and ungrounding these center taps, four magnetic cores each having two power windings and one control coil thereon, means connecting the output ends of the two windings on the first core respectively to one end of the first coil of the first group and to one end of the first coil of the second group, means connecting the output ends of the two windings on the second core respectively to the other ends of the first coils of said groups, means connecting the output ends of the two windings on the third core to the first ends respectively of the second coils of the two groups, means connecting the output ends of the two windings on the fourth core to the second ends respectively of the second coils of the two groups, a signal source for each core and respectively feeding the inputs of all the power windings on the core, and means for energizing the control coils of the cores only during certain spaced intervals when said signals may be expected to set up magnetomotive forces opposite to those resulting from the signals to be recorded during said intervals so that the power windings present a low impedance to said signals only during said intervals.

2. In a system for recording information, a plurality of recording heads, a plurality of first signal receiving means for receiving information signals, a separate magnetic core corresponding to each of said first signal receiving means, a plurality of input coils each linking one of said cores, means connecting each of said input coils in a series circuit with a corresponding one of said first signal receiving means and a different one of said recording heads, a plurality of control coils each linking one of said cores, a second signal receiving means for receiving periodic signals of one polarity only, and means connecting each of said control coils to said second signal receiving means, said connections being in sense to cause said control coils to produce from said periodic signals a magnetomotive force opposing the magnetomotive force produced by the corresponding input coils in response to said information signals so that the impedances said input coils offer to the transmission of information signals are small during said periodic signals and high during intervening periods.

3. A system for recording information comprising a recording medium, a plurality of recording heads in recording relation to said medium, a plurality of first signal receiving means for receiving information signals, a separate magnetic core corresponding to each of said first signal receiving means, said cores having a substantially rectangular hysteresis loop, a plurality of input coils each linking one of said cores, means connecting each of said input coils in a different series circuit with a corresponding one of said first signal receiving means and a different one of said recording heads, a plurality of control coils each linking one of said cores, a second signal receiving means for receiving periodic signals of one polarity only, and means connecting each of said control coils to said second signal receiving means, said connections being in sense to produce from said periodic signals a magnetomotive force opposing the magnetomotive force produced by the corresponding input coils in response to said information signals, whereby the impedances said input coils offer to the transmission of information signals are small during said periodic signals and high during intervening periods.

4. In a system for recording information, a plurality of recording heads, a plurality of sources of information signals, a separate magnetic core corresponding to each of said sources, a separate input coil linking each of said cores, means connecting each of said input coils in a different series circuit with a corresponding one of said sources and selected ones of said recording heads, said last named means including switch means in circuit with each of said recording heads and operative to selectively complete said series circuits between said heads and said sources, a control coil linking each of said cores, a source of periodic signals of one polarity only, and means connecting each of said control coils to said source of periodic signals in a sense to produce from said periodic signals a magnetomotive force opposing the magnetomotive force produced by the corresponding input coils in response to said information signals so that impedances to the transmission of said information signals to said selected recording heads are a small value during said periodic signals and a higher value during intervening periods.

5. A circuit for selectively transmitting information comprising, a plurality of information signal receiving elements, a plurality of sources of information signals, a separate magnetic core corresponding to each of said sources, a separate input coil means linking each of said cores, means connecting each of said input coil means in a different series circuits with a corresponding one of said sources and certain ones of said receiving elements, said last named means including switch means in circuit with each of said receiving elements and operative to selectively complete said series circuits between said receiving elements and said sources, control coil means linking said cores, a source of periodic signals connected to said control coil means in a sense to produce a magnetomotive force opposing the magnetomotive force produced by the corresponding input coil means in response to said information signals so that impedances to the transmission of said information signals to said selected receiving elements are small during said periodic signals and high during the periods between said signals.

6. A signal selector circuit comprising, a plurality of receiving elements, a plurality of sources of information signals, a separate magnetic core corresponding to each of said sources, said cores having a substantially rectangular hysteresis loop, a separate input coil linking each of said cores, means connecting each of said input coils in a different series circuit with a corresponding one of said sources and selected ones of said receiving elements, said last named means including switch means in circuit with each of said receiving elements and operative to selectively complete said series circuits between said elements and said sources, a separate control coil linking each of said cores, a source of periodic unidirectional signals, and means connecting each of said control coils to said source of periodic signals in sense to produce from said periodic signals a magnetomotive force opposing the magnetomotive force produced by the corresponding input coils in response to said information signals so that the impedances offered by said input coils to the transmission of said information signals is small during said periodic signals over a range of values of current through said input coils limited by the magnitude of said periodic signals and is large during periods between said periodic signals.

7. In a system for recording information, a plurality of groups of recording heads, a plurality of sources of information signals, a separate magnetic core corresponding to each of said sources, a plurality of input coils each linking one of said cores, means connecting each of said input coils to a corresponding source of information signals and to one of said groups of recording heads whereby an information signal being transmitted from one of said sources to one of said groups of heads causes the corresponding input coil to generate a magnetomotive force of certain direction, said last named means including switch means interposed in circuit with each of said groups of heads to selectively provide completion of the circuit between each of said sources of information signals and a selected one of said groups of heads, a separate control coil linking each of said cores, a source of periodic signals of one polarity, and means connecting each of said control coils to said source of periodic signals to produce in response thereto a magnetomotive force opposite to that produced by a corresponding input coil in response to said information signals so that upon selective actuation of one of said switch means said information signals are transmitted to a corresponding group of heads only for the duration of said periodic signals.

8. A system for recording information, comprising, a magnetic recording medium, a plurality of groups of magnetic recording heads in juxtaposition to said medium, a plurality of sources of information signals, a magnetic core corresponding to each of said sources, a plurality of power coils each linking one of said cores, means connecting each of said power coils to a corresponding source of information signals and to each of said groups of recording heads whereby an information signal being transmitted from one of said sources to one of said groups of heads causes the corresponding power coil to generate a magnetomotive force of certain direction, said last named means including switch means interposed in circuit with each of said groups of heads to selectively provide completion of the circuit between each of said sources of information signals and a selected one of said groups of heads, a separate control coil linking each of said cores, a source of periodic unidirectional signals, and means connecting each of said control coils to said source of periodic signals to produce in response thereto a magnetomotive force opposite that produced by a corresponding power coil in response to said information signals so that upon selective actuation of one of said switch means said information signals are transmitted to a corresponding group of heads simultaneously with the generation of said periodic signals and are not transmitted in the absence of said periodic signals.

9. In a recording system, a plurality of groups of recording heads, a plurality of sources of information signals, means connecting each of said sources for energization of only a certain head in each of said groups of heads, said connecting means including switch means having a first switch for each of said sources comprised of a magnetic core, a power coil on said core and in circuit with the corresponding source, a control coil on said core, and a source of periodic control pulses of one polarity only connected to energize said control coil during said pulses to oppose changes in the magnetic flux through said core due to said information signals occurring during said pulses, said switch means also having a second switch for each of said groups of heads for selectively connecting one of said group of heads to receive information signals from each of said sources simultaneously with the energization of said control coil.

10. In a system for recording and playing back the recording, a recording head including a center-tapped coil, first and second magnetic cores respectively linked by first and second power coils, first and second sources for producing the signals to be recorded, a first circuit serially connecting said first source, the first power coil, and one side of said center-tapped coil, a second circuit serially connecting said second source, the second power coil and the other side of said center-tapped coil, control coils linking said first and second magnetic cores, means which during recording energizes said control coils with pulses simultaneously with said signals to be recorded to produce magnetomotive forces in each of said cores in direction opposite to the magnetomotive forces produced by said power coils, thereby reducing the impedance of said power coils to the transmission of signals from said sources to said coil during the period of said pulses, and circuit means across the ends of said power coils that are connected to said sources for reproducing previously recorded signals as detected by said center-tapped coils.

References Cited in the file of this patent

UNITED STATES PATENTS

| | | |
|---|---|---|
| 2,611,025 | Jankowski | Sept. 16, 1952 |
| 2,713,674 | Schmitt | July 19, 1955 |
| 2,729,808 | Auerbach et al. | Jan. 3, 1956 |
| 2,783,456 | Steagall | Feb. 26, 1957 |
| 2,877,451 | Williams | Mar. 10, 1959 |

FOREIGN PATENTS

| | | |
|---|---|---|
| 762,057 | Great Britain | Nov. 21, 1956 |

OTHER REFERENCES

"Magnistors-Amplifiers or Storage Elements," Electronic Design, April 1955, pp. 26–27.

"Basic Magnetic Switching Circuits" (Durkee), Electrical Manufacturing, October 1956, pp. 102–106.